(12) United States Patent
Pietras

(10) Patent No.: US 7,552,775 B2
(45) Date of Patent: Jun. 30, 2009

(54) TAILING IN AND STABBING DEVICE AND METHOD

(75) Inventor: Bernd-Georg Pietras, Wedemark (DE)

(73) Assignee: Weatherford/Lamb, Inc., Houston, TX (US)

( * ) Notice: Subject to any disclaimer, the term of this patent is extended or adjusted under 35 U.S.C. 154(b) by 260 days.

(21) Appl. No.: 11/119,958

(22) Filed: May 2, 2005

(65) Prior Publication Data

US 2006/0243488 A1 Nov. 2, 2006

(51) Int. Cl.
*E21B 19/00* (2006.01)

(52) U.S. Cl. .................. 166/380; 166/77.51; 166/85.5; 414/745.8; 414/22.71

(58) Field of Classification Search .................. 175/85, 175/220; 166/77.51, 77.52, 379, 380, 88.5, 166/85.5; 414/22.52, 22.54, 22.57, 22.59, 414/745.8, 745.9, 22.55, 22.58, 22.62, 22.68, 414/22.71

See application file for complete search history.

(56) References Cited

U.S. PATENT DOCUMENTS

| | | | |
|---|---|---|---|
| 1,805,007 A | 5/1931 | Pedley | |
| 2,416,815 A | 3/1947 | Calhoun | |
| 2,450,934 A | 10/1948 | Calhoun | |
| 2,536,458 A | 1/1951 | Munsinger | |
| 2,590,639 A | 3/1952 | Moser | |
| 2,753,744 A | 7/1956 | Therien | |
| 2,803,434 A | 8/1957 | Heinish | |
| 3,023,651 A | 3/1962 | Wallace | |
| 3,212,593 A | 10/1965 | Reischl | |
| RE26,284 E | 10/1967 | O'Neill et al. | |
| 3,477,527 A | 11/1969 | Koot | |
| 3,651,959 A | 3/1972 | Castela et al. | |
| 3,795,326 A | 3/1974 | Neilon et al. | |
| 3,831,258 A | 8/1974 | Bjaime et al. | |
| 3,860,126 A | 1/1975 | Neimark, et al. | |
| 3,892,148 A | 7/1975 | Wiley | |
| 4,029,215 A | 6/1977 | Birdwell | |
| 4,030,746 A | 6/1977 | Langowski | |
| 4,192,206 A | 3/1980 | Schulze-Beckinghausen | |
| 4,274,778 A | 6/1981 | Putnam et al. | |
| 4,295,527 A | 10/1981 | Russe | |
| 4,297,922 A | 11/1981 | Higdon | |
| 4,304,433 A | 12/1981 | Langowski | |
| 4,333,365 A | 6/1982 | Perry | |
| 4,371,302 A | 2/1983 | Frias et al. | |

(Continued)

FOREIGN PATENT DOCUMENTS

EP 0 234 880 9/1987

(Continued)

OTHER PUBLICATIONS

Oil & Gas Journal, Frontiers of Drilling Technology, Deepwater Trial Tests Low-Dosage Hydrate Inhibitor, Jun. 17, 2002.

(Continued)

*Primary Examiner*—David J Bagnell
*Assistant Examiner*—Robert E Fuller
(74) *Attorney, Agent, or Firm*—Patterson & Sheridan, LLP

(57) ABSTRACT

An apparatus and method for handling a tubular pipe on a rig floor. In one embodiment, the apparatus includes a base, a track coupled to the base portion and a pair of arms slidably disposed along the track.

39 Claims, 8 Drawing Sheets

U.S. PATENT DOCUMENTS

| | | |
|---|---|---|
| 4,379,676 A | 4/1983 | Frias |
| 4,382,738 A | 5/1983 | Frias |
| 4,386,883 A | 6/1983 | Hogan et al. |
| 4,397,605 A | 8/1983 | Cowgill et al. |
| 4,403,897 A | 9/1983 | Willis |
| 4,403,898 A | 9/1983 | Thompson |
| 4,429,753 A | 2/1984 | Cushman |
| 4,625,796 A | 12/1986 | Boyadjieff |
| 4,652,195 A | 3/1987 | McArthur |
| 4,696,207 A | 9/1987 | Boyadjieff |
| 4,709,766 A | 12/1987 | Boyadjieff |
| 4,744,596 A | 5/1988 | Hiller et al. |
| 4,822,230 A | 4/1989 | Slettedal |
| 4,834,604 A | 5/1989 | Brittain et al. |
| 4,843,924 A | 7/1989 | Hauk |
| 4,921,386 A | 5/1990 | McArthur |
| 4,951,759 A * | 8/1990 | Richardson .................. 175/85 |
| 5,049,020 A | 9/1991 | McArthur |
| 5,062,756 A | 11/1991 | McArthur et al. |
| 5,127,790 A | 7/1992 | Teague |
| 5,150,642 A | 9/1992 | Moody et al. |
| 5,183,366 A | 2/1993 | Paech |
| 5,451,129 A | 9/1995 | Boyadjieff et al. |
| 5,458,454 A | 10/1995 | Sorokan |
| 5,520,072 A | 5/1996 | Perry |
| 5,537,900 A | 7/1996 | Schaar |
| 5,609,457 A | 3/1997 | Burns |
| 5,931,238 A | 8/1999 | Gilmore et al. |
| 5,941,324 A | 8/1999 | Bennett |
| 6,079,925 A | 6/2000 | Morgan et al. |
| 6,116,118 A | 9/2000 | Wesch, Jr. |
| 6,138,529 A | 10/2000 | Pietras |
| 6,206,096 B1 | 3/2001 | Belik |
| 6,220,807 B1 | 4/2001 | Sorokan |
| 6,253,845 B1 | 7/2001 | Belik |
| 6,330,911 B1 | 12/2001 | Allen et al. |
| 6,336,381 B2 | 1/2002 | McDonnell |
| 6,425,709 B1 | 7/2002 | Frijns |
| 6,591,471 B1 | 7/2003 | Hollingsworth et al. |
| 6,634,443 B1 | 10/2003 | Paech et al. |
| 6,695,559 B1 | 2/2004 | Pietras |
| 6,994,176 B2 | 2/2006 | Shahin et al. |
| 7,043,814 B2 | 5/2006 | Hollingsworth et al. |
| 7,055,594 B1 | 6/2006 | Springett et al. |
| 7,076,852 B2 | 7/2006 | Penman et al. |
| 7,090,021 B2 | 8/2006 | Pietras |
| 7,137,454 B2 | 11/2006 | Pietras |
| 7,140,445 B2 | 11/2006 | Shahin et al. |
| 7,188,547 B1 | 3/2007 | West et al. |
| 7,191,686 B1 | 3/2007 | Angelle et al. |
| 2004/0003490 A1 * | 1/2004 | Shahin et al. .................. 29/464 |
| 2004/0131449 A1 * | 7/2004 | Thompson ............... 414/22.51 |
| 2005/0126792 A1 * | 6/2005 | Berry ......................... 166/379 |
| 2006/0243488 A1 | 11/2006 | Pietras |
| 2006/0285941 A1 * | 12/2006 | Fikowski et al. ......... 414/22.54 |
| 2008/0038093 A1 * | 2/2008 | Lambert et al. .......... 414/22.56 |

FOREIGN PATENT DOCUMENTS

| | | |
|---|---|---|
| EP | 0586297 | 3/1994 |
| EP | 1679462 | 7/2006 |
| FR | 2682449 | 4/1993 |
| GB | 2394022 | 4/2004 |
| WO | WO 03/093629 A1 | 11/2003 |

OTHER PUBLICATIONS

GB Search Report, Application No. 0608361.2, Dated Jul. 21, 2006.
GB Search Report, Dated Nov. 11, 2006, Application No. 0608361.2.

* cited by examiner

TAILING IN AND STABBING DEVICE AND METHOD

BACKGROUND OF THE INVENTION

1. Field of the Invention

Various embodiments of the present invention generally relate to pipe handling systems for handling a tubular pipe, and more particularly, to a pipe positioning apparatus operable with a pipe pick-up and lay-down system for use in wellbore operations.

2. Description of the Related Art

In conventional well completion operations, a wellbore is formed to access hydrocarbon-bearing formations by the use of drilling. In drilling operations, a drilling rig is supported by the subterranean formation and used to urge a drill string toward the formation. A rig floor of the drilling rig is the surface from which drilling strings with cutting structures, casing strings, and other supplies are lowered to form a subterranean wellbore lined with casing. A hole is formed in a portion of the rig floor above the desired location of the wellbore. The axis that runs through the center of the hole formed in the rig floor is the well center.

In the drilling of oil and gas wells, it is generally known to employ various types of tubular pipe. Such pipes include drill pipe, drill collars, production tubing, well casing, and riser pipe. Such pipe is delivered to the drilling rig, and laid in individual joints horizontally upon a pipe rack. In the case of land wells, the pipe is typically delivered by a flat-bed truck. For offshore drilling, the pipe is delivered by barge or on a large floating vessel.

In order to use the pipe on the drilling rig, it is necessary to transport the pipe from the pipe rack to the rig floor. However, picking up and laying down drill pipe, casing and other tubular goods presents certain hazards to personnel on the rig floor. In addition, the manual handling of pipe, even with the assistance of wirelines, creates a risk that the pipe threads may be damaged. These concerns are magnified by the ever-increasing height of rig floors necessitated by the drilling of deeper wells.

After the pipe is delivered to the V-door ramp of the rig floor using a pick-up and lay-down system, an elevator is attached to the top portion of the pipe to lift the pipe from the V-door ramp and to position the pipe above the well center. While the top portion of the pipe is lifted from the V-door ramp, the lower portion of the pipe is manually positioned above the well center. Because the lower end of the pipe is hanging freely and unsupported, this task often presents a hazard to the personnel on the rig floor as they try to maneuver the pipe to the well center. A rope is often used to guide the lower portion of the pipe to the well center.

Therefore, a need exists in the art for a method and apparatus for an improved method and apparatus for positioning the pipe to the well center.

SUMMARY OF THE INVENTION

Various embodiments of the invention are directed to an apparatus for handling a tubular pipe on a rig floor. In one embodiment, the apparatus includes a base, a track coupled to the base portion and a pair of arms slidably disposed along the track.

In another embodiment, the apparatus includes a track anchorable to the rig floor at a first end and disposed in a manner such that the track extends in a direction towards a well center and an arm having a first end slidably and pivotably disposable on the track and a second end constructed and arranged to contact and urge an end of the tubular pipe suspended from above in the direction towards the well center.

Various embodiments of the invention are also directed to a method for positioning a tubular pipe from a V-Door ramp to a well center on a rig floor. In one embodiment, the method includes removably attaching a pipe handling apparatus to the rig floor between the well center and the V-Door ramp. The pipe handling apparatus comprises a pair of arms slidably disposed along a track. The method further includes lifting an upper portion of the tubular pipe using an elevator and moving the upper portion of the tubular pipe toward the well center using the elevator while supporting a lower portion of the tubular pipe with the pipe handling apparatus.

In one embodiment, the method includes lifting an upper end of the tubular pipe above the rig floor and urging a lower end of the tubular pipe towards a well center with a first end of an arm, while a second end of the arm moves along and pivots in a track that extends towards the well center.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
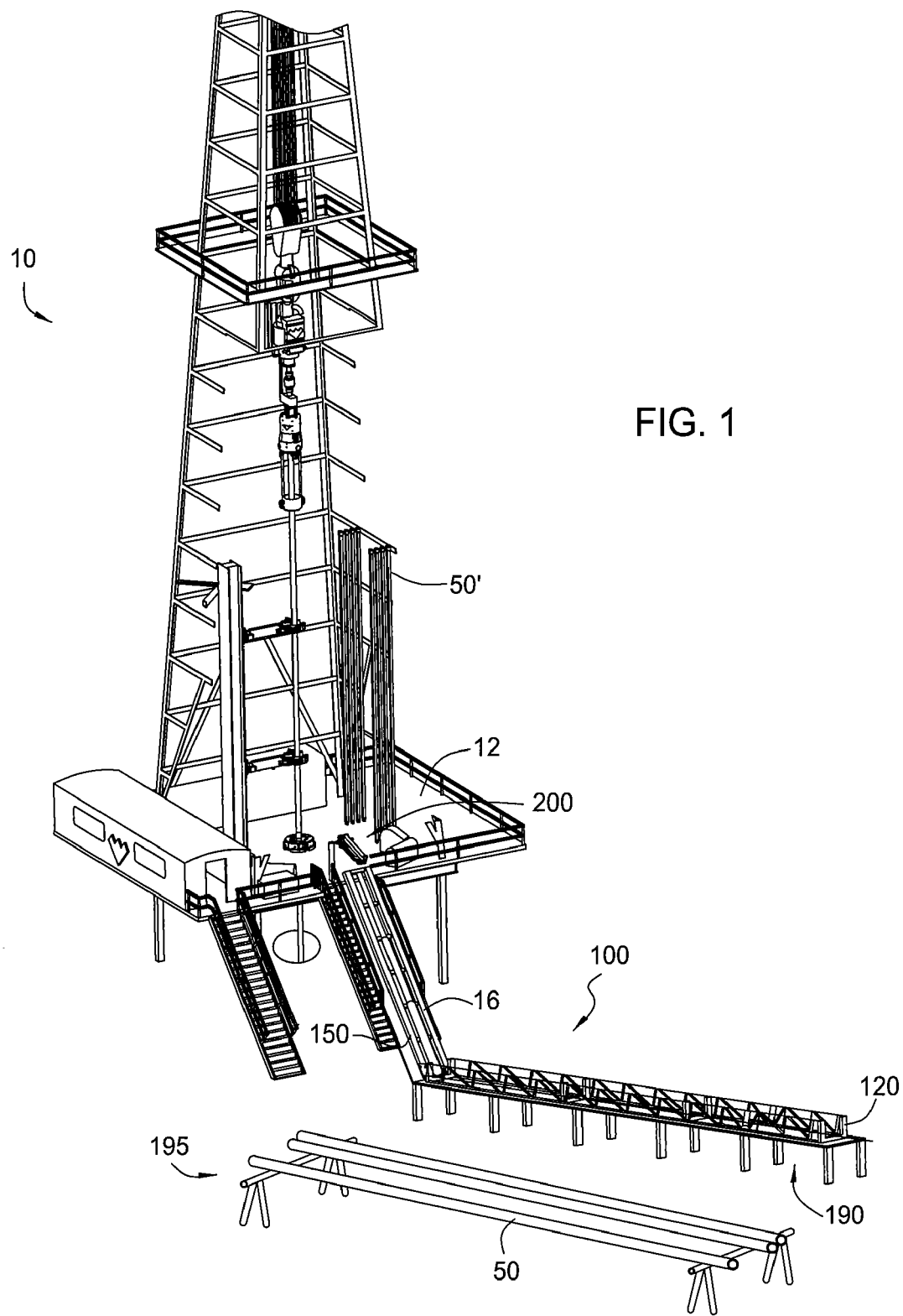
FIG. 1 illustrates a perspective view of a pick-up and lay-down system that may be used in connection with a pipe handling apparatus in accordance with one or more embodiments of the invention.

FIG. 1 illustrates a perspective view of a pick-up and lay-down system 100 that may be used in connection with a pipe handling apparatus 200 in accordance with one or more embodiments of the invention. The pick-up and lay-down system 100 is set up adjacent to a drilling rig 10. A portion of the drilling rig 10 is visible in FIG. 1, including the rig floor 12. The rig 10 shown is a land rig having a rig floor 12 above the ground. The rig floor 12 has a hole therethrough, the center longitudinal axis of which is commonly termed well center. A spider (not shown) is disposed around or within the hole on the rig floor 12 to grippingly engage casing strings at various stages of a well completion operation.

The pick-up and lay-down system 100 is designed to receive a joint of pipe 50 from a pipe rack 195 at ground level, and deliver it to the rig floor 12 for further stacking and use during a drilling or workover operation. Reciprocally, the pick-up and lay-down system 100 is able to receive pipe 50' from the rig floor 12, and return it back to ground level where it can be expelled onto the pipe rack 195.

The pick-up and lay-down system 100 may include a trestle 120, which serves as a cradle for the pick-up and lay-down system 100. The trestle 120 may be placed on top of a catwalk 190. Those of ordinary skill in the art will appreciate that most drilling sites, especially those on land, include a catwalk that serves as a staging area for transferring pipe 50 from various pipe racks (such as the pipe rack 195) to the rig floor 12. Typically, the catwalk 190 has an elevated solid platform that is of approximately the same height as the pipe racks. The trestle 120 defines an elongated frame structure having a plurality of structural support members.

The pick-up and lay-down system 100 may further include an inclined ramp 150, which is pivotally connected to the trestle 120. The inclined ramp 150 is disposed against the rig 10 and is supported by a V-Door ramp 16. Other details of the pick-up and lay-down system 100 may be found in commonly assigned WO/03093629, which is incorporated herein by reference. In addition to the pick-up and lay-down system 100 described herein, other types of pick-up and lay-down systems may be used in connection with one or more embodiments of the invention.

Figure 2A:
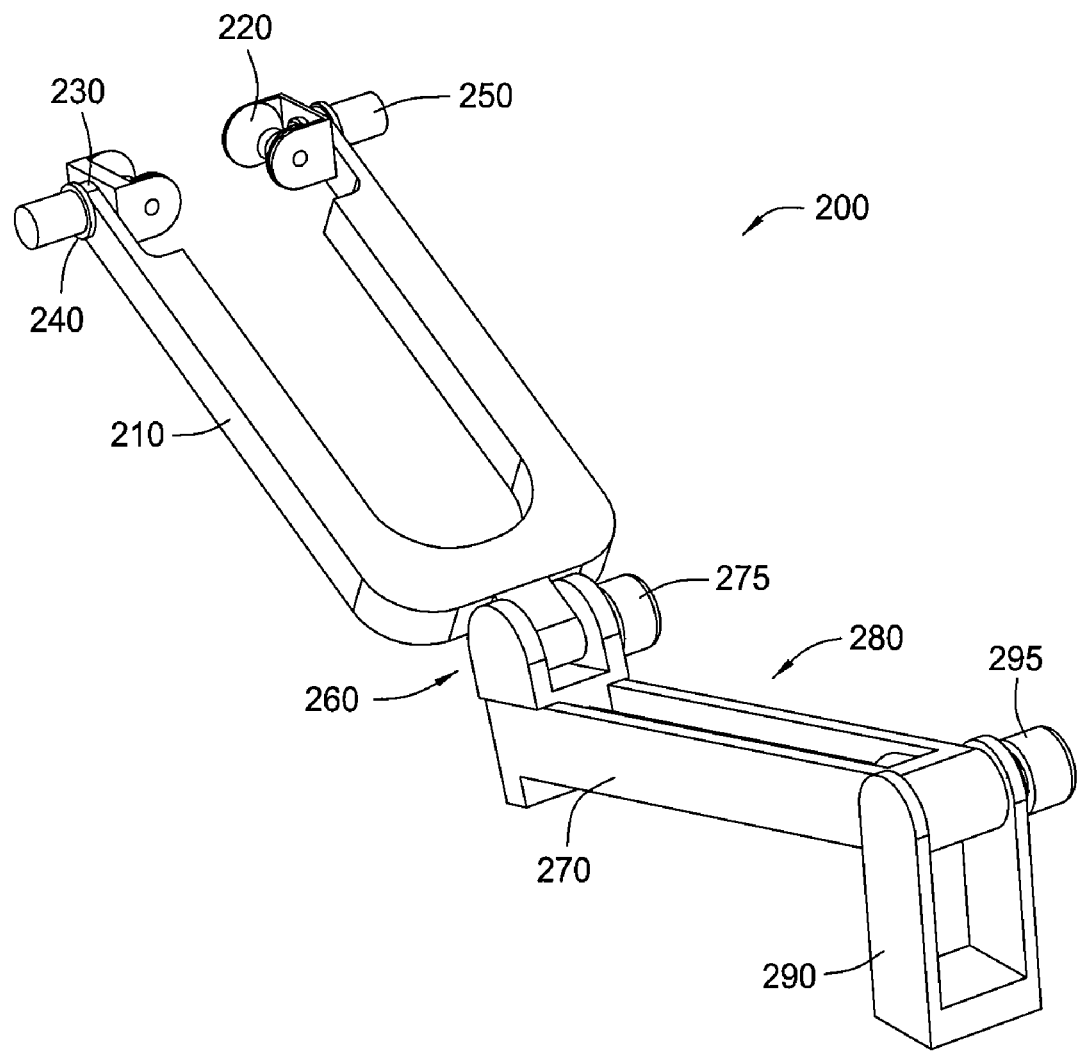
FIG. 2A illustrates a side perspective view of the pipe handling apparatus in accordance with one or more embodiments of the invention.
Figure 2B:
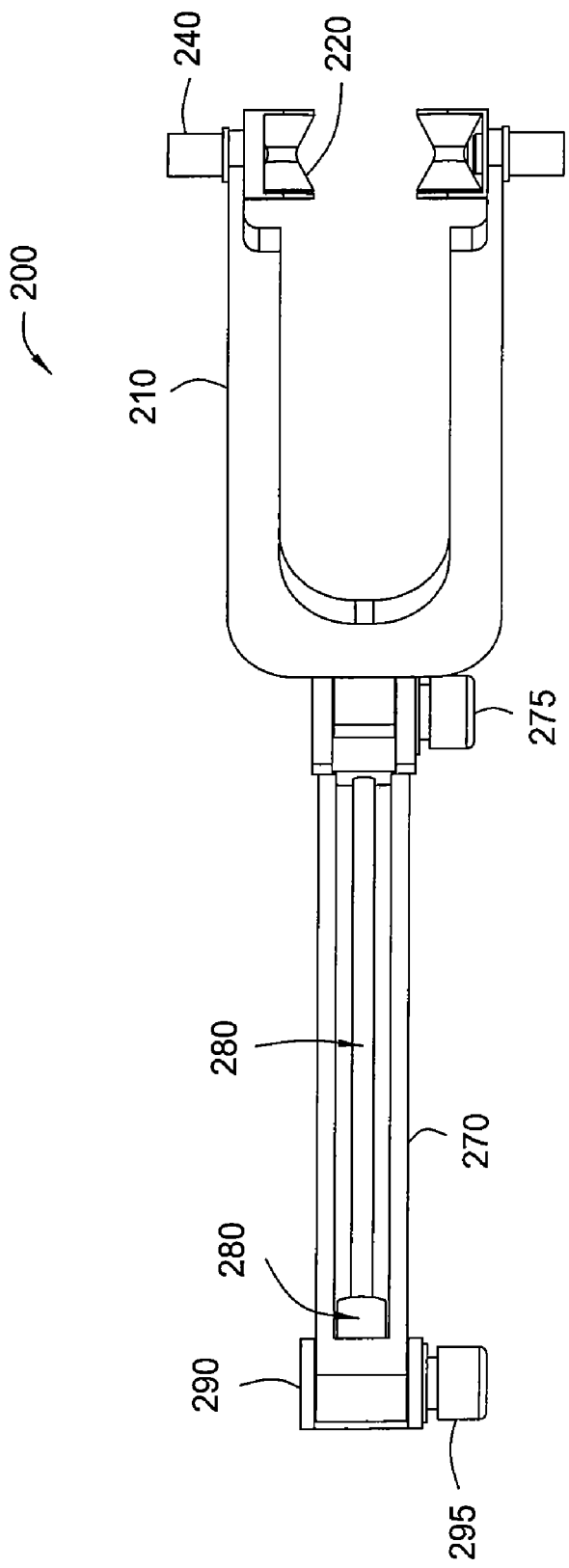
FIG. 2B illustrates an upper perspective view of the pipe handling apparatus in accordance with one or more embodiments of the invention.
Figure 3:
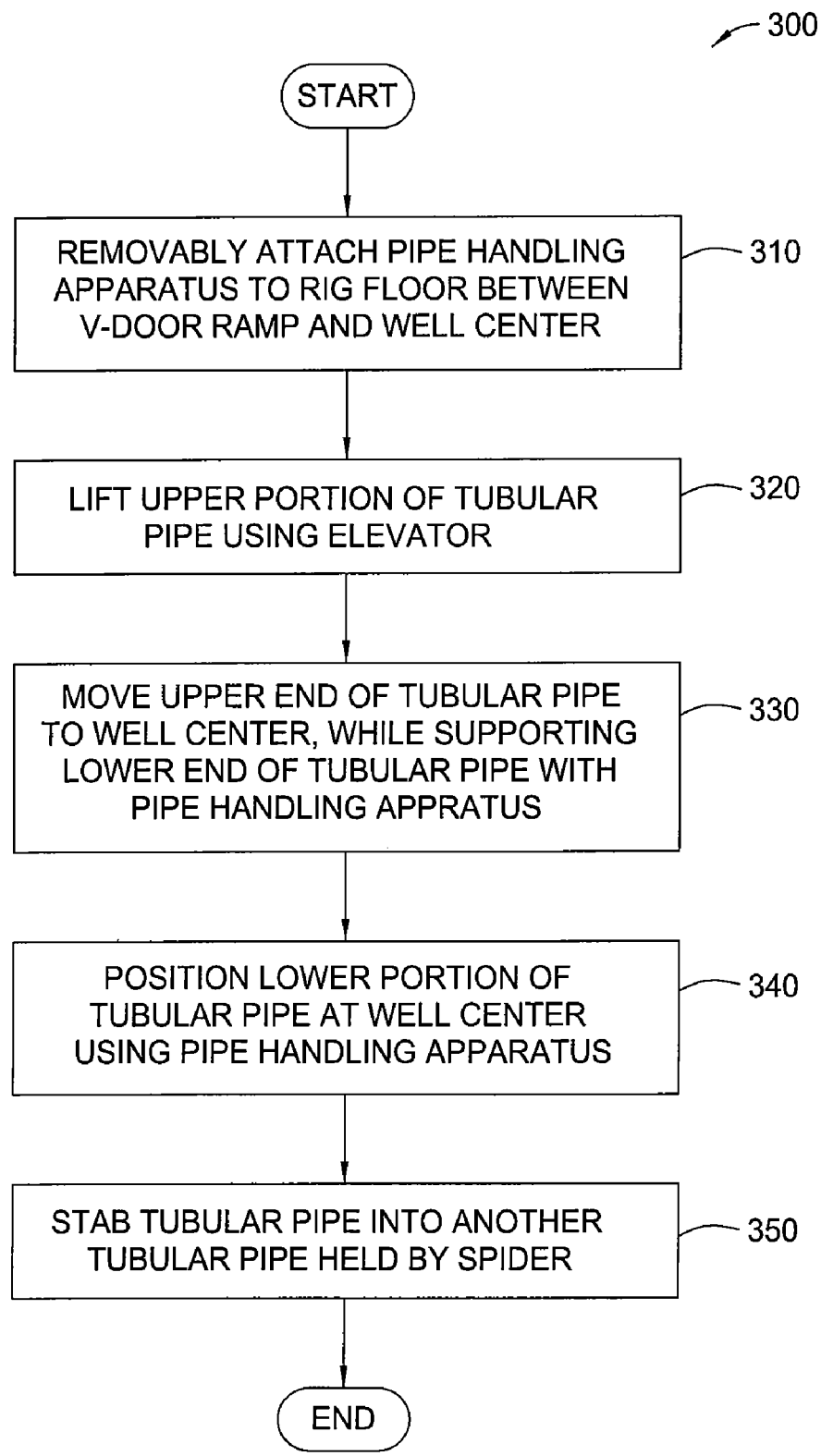
FIG. 3 illustrates a method for positioning a tubular pipe from a V-Door ramp to a well center in accordance with one or more embodiments of the invention.
Figure 5:
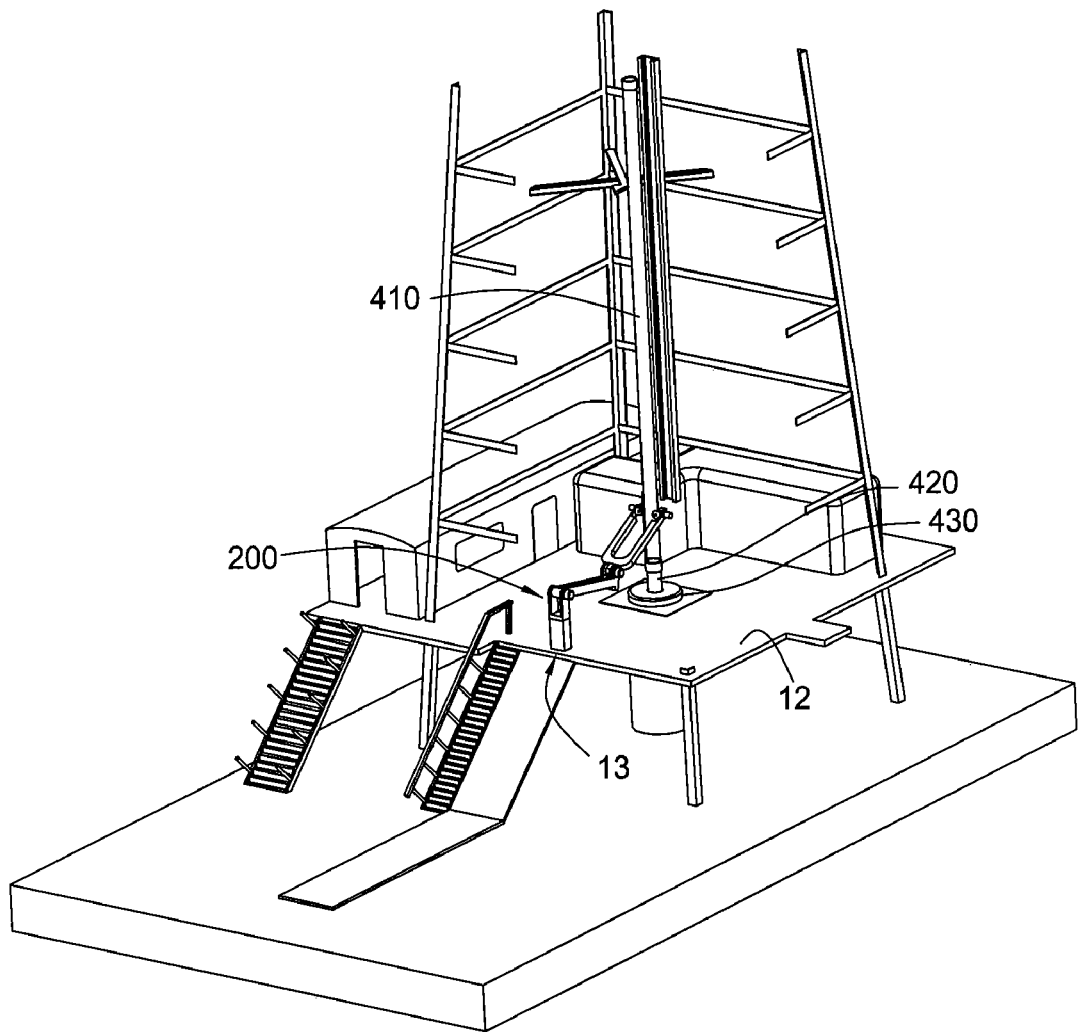
FIG. 5 illustrates the pipe handling apparatus being removably attached to a post in accordance with one or more embodiments of the invention.

FIG. 2A illustrates a side perspective view of the pipe handling apparatus 200 and FIG. 2B illustrates an upper perspective view of the pipe handling apparatus 200 in accordance with one or more embodiments of the invention. The pipe handling apparatus 200 includes a base 290 and a track 270 pivotally connected to the base 290. The track 270 may be pivoted around the base 290 by a track drive 295. The base 290 is configured to be removably attached to the rig floor 12 or against the posts 13 at the V-Door ramp 16 as shown in FIG. 5. The base 290 may be attached by any attachment means commonly known by persons of ordinary skill in the art.

The pipe handling apparatus 200 further includes a sledge 260 slidably disposed on the track 270 and a pair of arms 210 pivotally coupled to the sledge 260. The sledge 260 is coupled to an arm drive 275, which is configured to pivot the arms 210 around the sledge 260. The sledge is also coupled to a linear drive 280, which is configured to linearly drive the sledge 260 along the track 270, and thereby linearly drive the arms 210 along the track 270.

A roller 220 is disposed at each arm end 210. Each roller 220 is attached to the arm 210 by a carrier 230 and a hydraulic cylinder 240. Each hydraulic cylinder 240 includes a piston that may be pivoted by a swivel drive 250 to position the roller 220 connected thereto. The rollers 220 may also be pivoted using other means, including a motor.

The swivel drive 250, the arm drive 275, the linear drive 280 and the track drive 295 may be controlled by encoders that may be directly or indirectly attached to the respective drives. The drives may also operate as brakes (rotational or linear), which may become useful during a tail in. Embodiments of the invention also contemplate other types of drives, including hydraulic cylinders, fluidic cylinders, motor drives with chains and motor drives with spindles.

The pipe handling apparatus 200 is configured to operate with an elevator (not shown) in transporting a tubular pipe from the V-Door ramp 16 to the well center. In one embodiment, the pipe handling apparatus 200 may be used in operation with an elevator to guide a tubular pipe and to stab the tubular pipe with another tubular pipe held by a spider on the rig floor 12. As such, the pipe handling apparatus 200 may be used for tailing in and stabbing a tubular pipe into another tubular pipe.

FIGS. 3 and 4A-C illustrate a method 300 for positioning a tubular pipe 410 from a V-Door ramp to a well center in accordance with one or more embodiments of the invention. At step 310, the pipe handling apparatus 200 is removably attached to the rig floor 12. The pipe handling apparatus 200 may be removably attached between the V-Door ramp 16 and the well center or against the posts at the V-Door ramp 16. In one embodiment, the pipe handling apparatus 200 is attached to the rig floor 12 by attaching the base 290 to the rig floor 12. The base 290 may be attached to the rig floor 12 by any attachment means commonly known by persons of ordinary skill in the art.

Figure 4A:
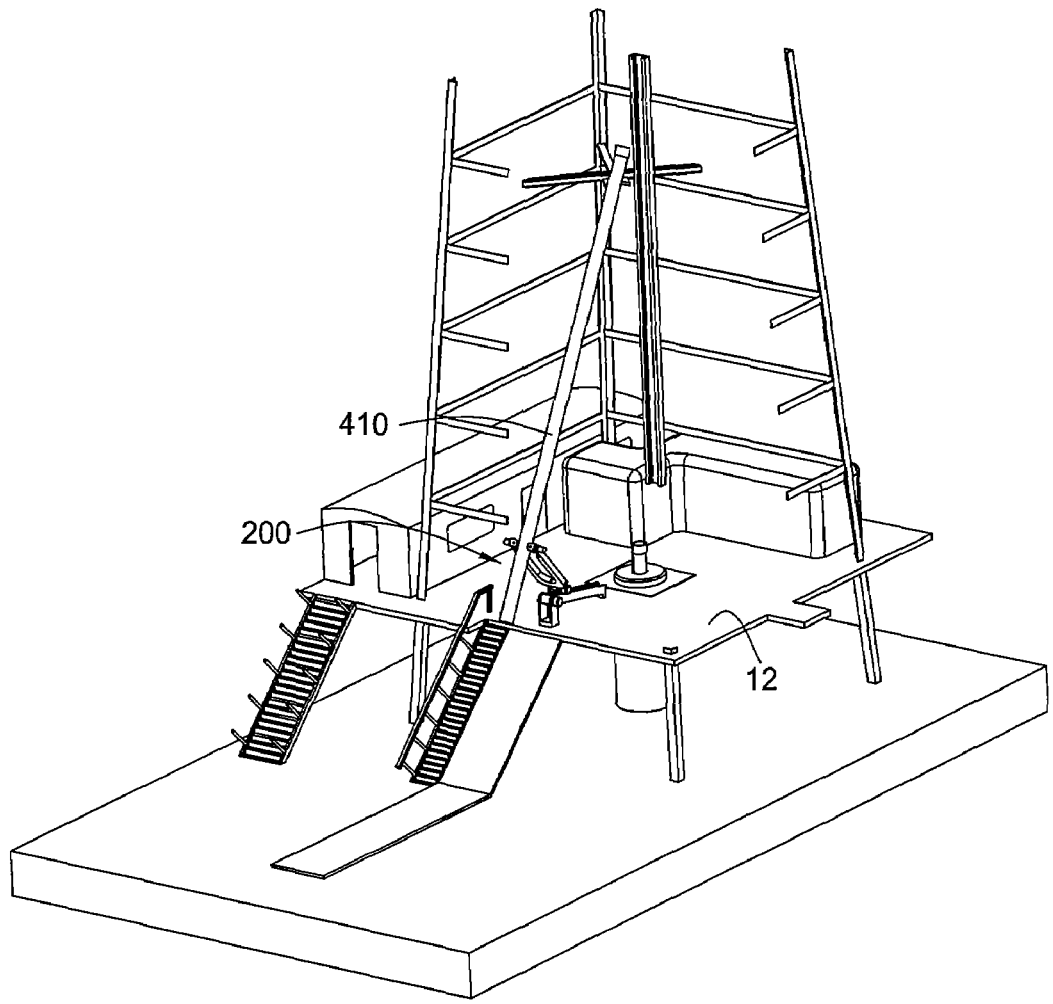
FIG. 4A illustrates the pipe handling apparatus clamping the lower end of the tubular pipe in accordance with one or more embodiments of the invention.
Figure 4B:
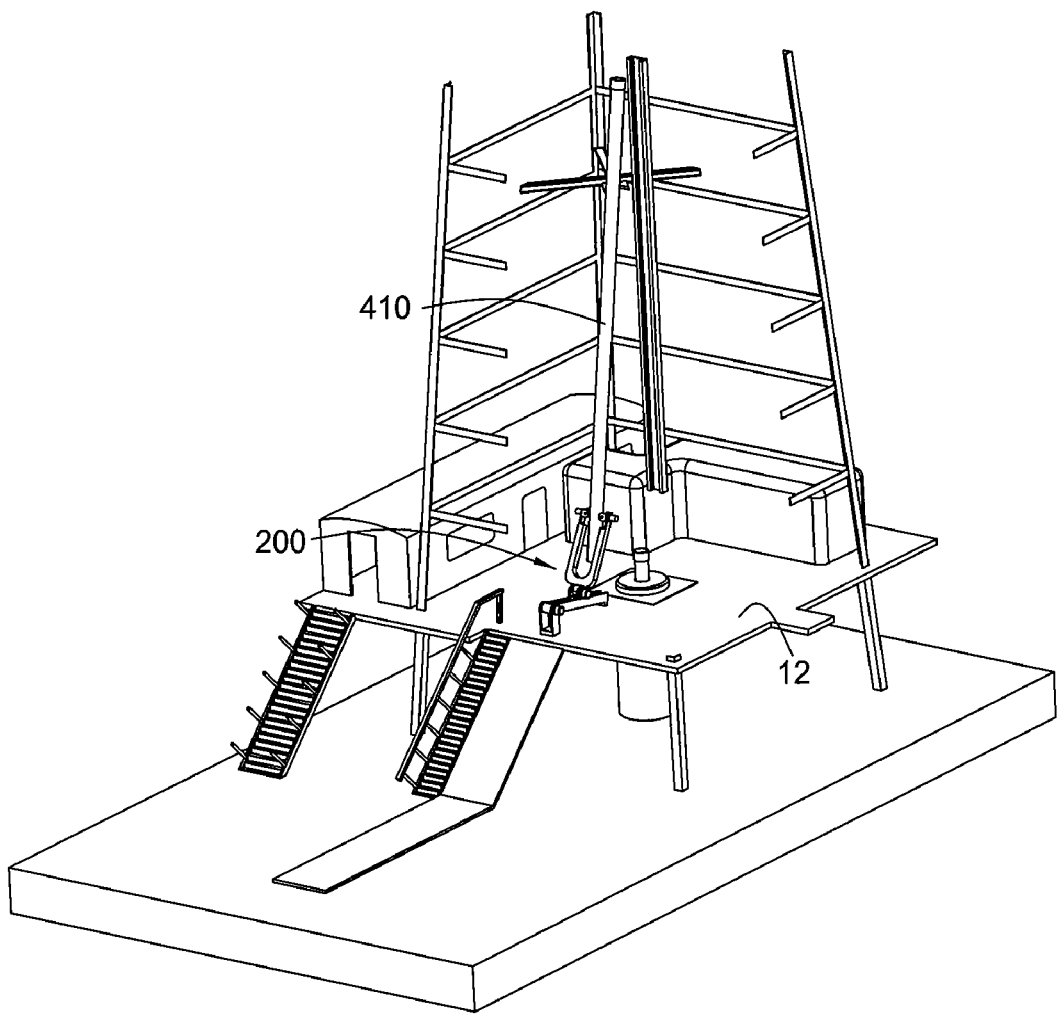
FIG. 4B illustrates the pipe handling apparatus supporting and guiding the lower portion of the tubular pipe as the elevator positions the tubular pipe to the well center in accordance with one or more embodiments of the invention.

At step 320, the upper portion of a tubular pipe 410 is picked up by an elevator from the V-Door ramp 16. At step 330, the elevator moves the upper portion of the tubular pipe 410 from the V-Door ramp 16 toward the well center, while the pipe handling apparatus 200 supports the lower end of the tubular pipe 410. In particular, the lower end of the tubular pipe 410 is clamped between the rollers 220. FIG. 4A illustrates the pipe handling apparatus 200 clamping the lower end of the tubular pipe 410 and FIG. 4B illustrates the pipe handling apparatus 200 supporting and guiding the lower portion of the tubular pipe 410 as the elevator positions the tubular pipe 410 to the well center. Positioning the lower portion of the tubular pipe 410 to the well center may involve pivoting the arms 210 around the sledge 260 and linearly driving the sledge 260 along the track 270 toward the well center.

At step 340, the pipe handling apparatus 200 positions the lower portion of the tubular pipe 410 at the well center.

Figure 4C:
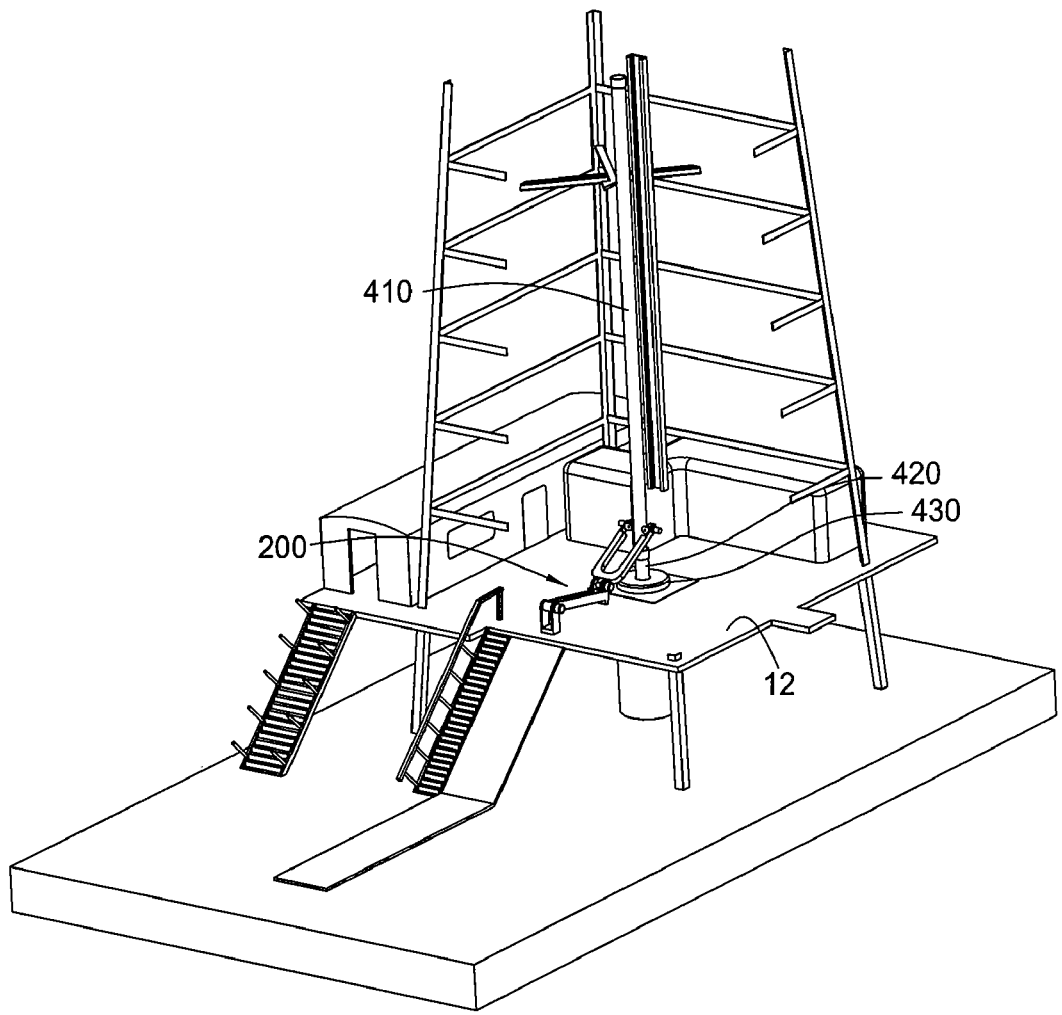
FIG. 4C illustrates the elevator and the pipe handling apparatus positioning tubular pipe directly above tubular pipe in accordance with one or more embodiments of the invention.

In accordance with one embodiment, the pipe handling apparatus 200 in operation with the elevator may be used to position and stab tubular pipe 410 to another tubular pipe, e.g., tubular pipe 420. As such, the elevator in operation with the pipe handling apparatus 200 may position tubular pipe 410 directly above tubular pipe 420 disposed in a spider 430 on the rig floor 12 (step 340). FIG. 4C illustrates the elevator and the pipe handling apparatus 200 positioning tubular pipe 410 directly above tubular pipe 420. At step 350, tubular pipe 410 is stabbed into the box of a coupling 440 coupled to tubular pipe 420.

The travel sequences in connection with positioning the tubular pipe 410 described above may be programmed into a control system in operation with the pipe handling apparatus 200 and the elevator. For example, the positions of the arms 210 or the sledge 260 may be memorized for future use. One or more sensors may be used to memorize the positions of the various parts of the pipe handling apparatus. In one embodiment, once a tubular pipe has been tailed in, the positions of the arms 210 and/or the sledge 260 may be memorized by a position memory. These positions may then be used by the control system to repeat the movements and travel sequences of the various parts (e.g., the arms 210 and the sledge 260) of the pipe handling apparatus. The positions, movements and travel sequences may also be controlled via wireless communication or the Internet.

The control system may be a general-purpose computer, a microprocessor, a micro-controller, or any other known type of computer. The control system may include at least one central processing unit (CPU), support circuits, and memory. The CPU may include one or more conventionally available microprocessors. The support circuits may be well known circuits that include cache, power supplies, input/output interface circuitry and the like. The memory may include random access memory, read only memory, removable disk memory, flash memory, and various combinations of these types of memory. The memory may sometimes be referred to as main memory and may in part be used as cache memory. The memory may store an operating system and various software applications.

While the foregoing is directed to embodiments of the present invention, other and further embodiments of the invention may be devised without departing from the basic scope thereof, and the scope thereof is determined by the claims that follow.

What is claimed is:

1. An apparatus for handling a tubular pipe on a rig floor, comprising:
    a base;
    a track coupled to the base, wherein the track is pivotable around the base; and
    a pair of arms slidably disposed along the track, wherein the arms comprise a pair of rollers for guiding the tubular pipe, wherein the arms are configured to pivot around an axis perpendicular to the track, wherein the rollers are coupled to the arms using carriers that are pivotable about an axis perpendicular to the arms to position the rollers.

2. The apparatus of claim 1, further comprising a track drive coupled to the track and the base, wherein the track drive is configured to pivot the track around the base.

3. A method for positioning a tubular pipe from a V-Door ramp to a well center on a rig floor, comprising:
    removably attaching a base of a pipe handling apparatus to the rig floor between the well center and the V-Door ramp, wherein the pipe handling apparatus comprises a pair of arms slidably disposed along a track, and wherein the track is pivotable around the base;
    lifting an upper portion of the tubular pipe using an elevator; and
    moving the upper portion of the tubular pipe toward the well center using the elevator while supporting a lower portion of the tubular pipe with the pipe handling apparatus.

4. The method of claim 3, wherein moving the upper portion of the tubular pipe toward the well center while supporting the lower portion comprises pivoting the arms around an axis perpendicular to the track.

5. The method of claim 4, wherein moving the upper portion of the tubular pipe toward the well center while supporting the lower portion comprises driving the arms along the track toward the well center.

6. The method of claim 5, wherein driving the arms along the track comprises linearly driving the arms along the track.

7. The method of claim 3, wherein the pipe handling apparatus is removably disposed against one or more posts at the V-Door ramp.

8. The method of claim 3, further comprising positioning the lower portion of the tubular pipe at the well center.

9. The method of claim 3, wherein supporting the lower portion of the tubular pipe comprises clamping the lower portion of the tubular pipe with a pair of rollers.

10. The method of claim 3, further comprising stabbing the lower portion of the tubular pipe into a coupling disposed at the well center.

11. The method of claim 10, wherein stabbing the lower portion comprises completely inserting a pin end of the tubular pipe into the coupling.

12. A tubular pipe handling apparatus for use on a rig floor, comprising:
    the rig floor;
    a track anchored or removably attached to the rig floor at a first end and disposed in a manner such that the track extends substantially horizontally in a direction towards a well center; and
    an arm having a first end slidably and pivotably disposed on the track and a second end constructed and arranged to guide an end of a tubular pipe suspended from above in the direction towards the well center.

13. The apparatus of claim 12, wherein the arm comprises a roller for holding the tubular pipe.

14. The apparatus of claim 13, wherein the roller is configured to support a lower end of the tubular pipe as the tubular pipe is being positioned to the well center.

15. The apparatus of claim 12, further comprising:
    a sledge slidably disposed on the track, wherein the arm is pivotally connected to the sledge.

16. The apparatus of claim 12, further comprising:
    a first drive configured to drive the arm along the track; and
    a second drive configured to pivot the arm around the track.

17. The apparatus of claim 16, further comprising:
    a controller in communication with the first and second drives.

18. The apparatus of claim 12, wherein the track is anchored or removably attached to the rig floor by a post coupled to the rig floor.

19. A method for handling a tubular pipe on a rig floor, comprising:
    lifting an upper end of the tubular pipe above the rig floor; and
    guiding a lower end of the tubular pipe towards a well center with a first end of an arm, while a second end of the arm moves along and pivots on a track that extends substantially horizontally towards the well center.

20. A method for positioning a tubular pipe from a V-Door ramp to a well center on a rig floor, comprising:
    removably attaching a pipe handling apparatus to the rig floor between the well center and the V-Door ramp, wherein the pipe handling apparatus comprises a pair of arms slidably disposed along a track;
    lifting an upper portion of the tubular pipe using an elevator; and
    moving the upper portion of the tubular pipe toward the well center using the elevator while guiding a lower portion of the tubular pipe with the pipe handling apparatus while the tubular pipe is at an angle relative to a vertical axis.

21. The method of claim 20, wherein moving the upper portion of the tubular pipe toward the well center while guiding the lower portion comprises pivoting the arms around an axis perpendicular to the track.

22. The method of claim 20, wherein guiding the lower portion of the tubular pipe comprises clamping the lower portion of the tubular pipe with a pair of rollers.

23. The method of claim 22, wherein the lower portion of the tubular pipe is moved from the V-Door ramp.

24. An apparatus for handling a tubular pipe on a rig floor, comprising:
    a base, wherein the base is configured to be removably attached to the rig floor;
    a track coupled to the base, wherein the track is pivotable around the base; and
    a pair of arms slidably disposed along the track, wherein an end of each arm comprises a roller for controlling the tubular pipe, wherein the roller is coupled to each arm using a carrier that is pivotable about an axis perpendicular to each arm to position the roller.

25. An apparatus for handling a tubular pipe on a rig floor, comprising:
a base;
a track coupled to the base, wherein the track is pivotable around the base; and
a pair of arms slidably disposed along the track, wherein the arms comprise a pair of rollers for holding the tubular pipe, wherein the rollers are coupled to the arms using a pair of carriers that are pivotable about an axis perpendicular to the arms to position the rollers.

26. The apparatus of claim 25, wherein the rollers are configured to support a lower end of the tubular pipe as the tubular pipe is being positioned to a well center.

27. The apparatus of claim 25, wherein the base is removably disposed against a post.

28. An apparatus for handling a tubular pipe on a rig floor, comprising:
a base;
a track coupled to the base, wherein the track is pivotable around the base;
an arm slidably disposed along the track; and
a sledge having an upper section and a lower section, wherein the upper section is slidably disposed on the track, wherein the lower section is slidably disposed adjacent rails of the track and extends between the rails of the track, wherein the arm is pivotally connected to the upper section of the sledge.

29. The apparatus of claim 28, further comprising a drive disposed inside the track, wherein the drive is configured to drive the sledge along the track.

30. The apparatus of claim 29, wherein the drive is a linear drive.

31. The apparatus of claim 28, further comprising an arm drive coupled to the sledge, wherein the arm drive is configured to pivot the arms around the sledge.

32. The apparatus of claim 28, wherein a bottom surface of the upper section is slidably disposed on the rails of the track.

33. The apparatus of claim 28, wherein the upper section includes a support that is coupled to the arm.

34. The apparatus of claim 28, wherein the lower section is coupled to a linear drive operable to drive the sledge along the track.

35. The apparatus of claim 28, wherein the base is removably attached to a post coupled to the rig floor.

36. An apparatus for handling a tubular pipe on a rig floor, comprising:
a base;
a track coupled to the base, wherein the track is pivotable around the base; and
an arm slidably disposed along the track, wherein the arm comprises a roller for holding the tubular pipe, wherein the roller is coupled to the arm using a carrier that is pivotable about an axis perpendicular to the arm to position the roller.

37. The apparatus of claim 36, wherein the base is removably disposed against a post.

38. An apparatus for handling a tubular pipe on a rig floor, comprising:
a base;
a track coupled to the base, wherein the track is pivotable around the base; and
an arm slidably disposed along the track, wherein the arm comprises a roller for guiding the tubular pipe, wherein the arm is configured to pivot around an axis perpendicular to the track, wherein the roller is coupled to the arm using a carrier that is pivotable about an axis perpendicular to the arm to position the roller.

39. The apparatus of claim 38, wherein the base is removably attached to a post coupled to the rig floor.

* * * * *